United States Patent
Silverstein et al.

(10) Patent No.: US 11,133,955 B2
(45) Date of Patent: Sep. 28, 2021

(54) TESTING AUTOMATED SMART DEVICE FUNCTIONS WITHIN SMART ENVIRONMENTS

(71) Applicant: INTERNATIONAL BUSINESS MACHINES CORPORATION, Armonk, NY (US)

(72) Inventors: Zachary A. Silverstein, Austin, TX (US); Jacob Ryan Jepperson, Austin, TX (US); Frank Eduardo Chavez, Lima (PE); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/554,785

(22) Filed: Aug. 29, 2019

(65) Prior Publication Data
US 2021/0067366 A1 Mar. 4, 2021

(51) Int. Cl.
H04L 12/28 (2006.01)
H04L 12/26 (2006.01)

(52) U.S. Cl.
CPC .......... *H04L 12/2825* (2013.01); *H04L 43/50* (2013.01); *H04L 2012/285* (2013.01)

(58) Field of Classification Search
CPC ................. H04L 12/2825; H04L 43/50; H04L 2012/285
See application file for complete search history.

(56) References Cited

U.S. PATENT DOCUMENTS 9,454,893 B1 9/2016 Warren et al.
10,217,068 B1 2/2019 Davis et al.
(Continued)

FOREIGN PATENT DOCUMENTS

| CN | 104865837 | 8/2015 |
| CN | 105204991 | 12/2015 |
| CN | 106502904 | 3/2017 |

OTHER PUBLICATIONS

Brownlee, "How to Calculate Correlation Between Variables in Python", https://machinelearningmastery.com/how-to-use-correlation-to-understand-the-relationship-between-variables/, Statistical Methods, Apr. 27, 2018, 11 pages.
(Continued)

*Primary Examiner* — Philip C Lee
(74) *Attorney, Agent, or Firm* — Daniel Yeates; Andrew D. Wright; Roberts Calderon Safran & Cole, P.C.

(57) ABSTRACT

System and methods for testing smart device functions within a smart environment are disclosed. In embodiments, a method includes accessing test case data that associates one or more smart device commands with an event type based on historic event data from a plurality of participating smart environments; determining a test case for the event type based on the test case data, wherein the test case is configured to initiate a test of a smart device command of a smart device within a smart environment of a participant; determining that the test case can be initiated at the smart environment based on rules and participant data indicating a location of the participant with respect to the smart environment; and initiating execution of the test case by a smart device controller of the smart environment, wherein the execution causes the smart device controller to test the smart device command.

20 Claims, 7 Drawing Sheets

(56) References Cited

U.S. PATENT DOCUMENTS

| | | |
|---|---|---|
| 10,229,394 B1 | 3/2019 | Davis et al. |
| 10,274,382 B1 * | 4/2019 | Trundle .................. F24F 11/30 |
| 2019/0235994 A1 * | 8/2019 | Epperlein .......... G06Q 30/0283 |
| 2019/0353156 A1 * | 11/2019 | Ward .................... F04B 23/021 |

OTHER PUBLICATIONS

Mell et al., "The NIST Definition of Cloud Computing", NIST, Special Publication 800-145, Sep. 2011, 7 pages.

\* cited by examiner

TESTING AUTOMATED SMART DEVICE FUNCTIONS WITHIN SMART ENVIRONMENTS

BACKGROUND

The present invention relates generally to smart device systems and, more particularly, to the testing of automated smart device functions within smart environments.

Intelligent systems for smart environments are increasingly utilized for home or business automation and generally include one or more smart controllers and smart devices (e.g., internet-of-things (IOT) devices) controlled by the smart controller. Such intelligent systems may control several different onsite smart devices during emergency or critical situations. One example of an intelligent system is a smart home monitoring system including a smart controller for controlling a variety of smart devices or home equipment. The smart controller may receive sensor data from the home equipment in order to determine if a failure of the home equipment has occurred.

SUMMARY

In a first aspect of the invention, there is a computer-implemented method including accessing, by a computing device, test case data that associates one or more smart device commands with an event type based on historic event data from a plurality of participating smart devices; determining, by the computing device, a test case for the event type based on the test case data, wherein the test case is configured to initiate a test of a smart device command of a smart device within a smart environment of a participant to determine successful or unsuccessful implementation of the smart device command by the smart device; determining, by the computing device, that the test case can be initiated at the smart environment based on rules and participant data indicating a location of the participant with respect to the smart environment; and initiating, by the computing device, execution of the test case by a smart device controller of the smart environment based on the determining that the test case can be initiated, wherein the execution causes the smart device controller to test the smart device command.

In another aspect of the invention, there is a computer program product including a computer readable storage medium having program instructions embodied therewith. The program instructions are executable by a computing device to cause the computing device to generate a test case based on historic smart device usage data from a plurality of smart environments, wherein the test case is configured to initiate a test of a smart device command of a smart device to determine successful or unsuccessful implementation of the smart device command by the smart device; determine the test case is a match for a smart environment of a participant; dynamically schedule execution of the test case at the smart environment of the participant; and initiate the execution of the test case by a smart device controller of the smart environment of the participant, wherein the execution causes the smart device controller to test the smart device command.

In another aspect of the invention, there is system including a processor, a computer readable memory, and a computer readable storage medium. The system includes program instructions to predict an impending critical event for a smart environment of a participant; program instructions to determine a test case for the smart environment based on the impending critical event; program instructions to determine a schedule for execution of the test case at the smart environment of the participant; and program instructions to initiate the execution of the test case by a smart device controller of the smart environment of the participant, wherein the execution causes the smart device controller to test the smart device command based on the schedule. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
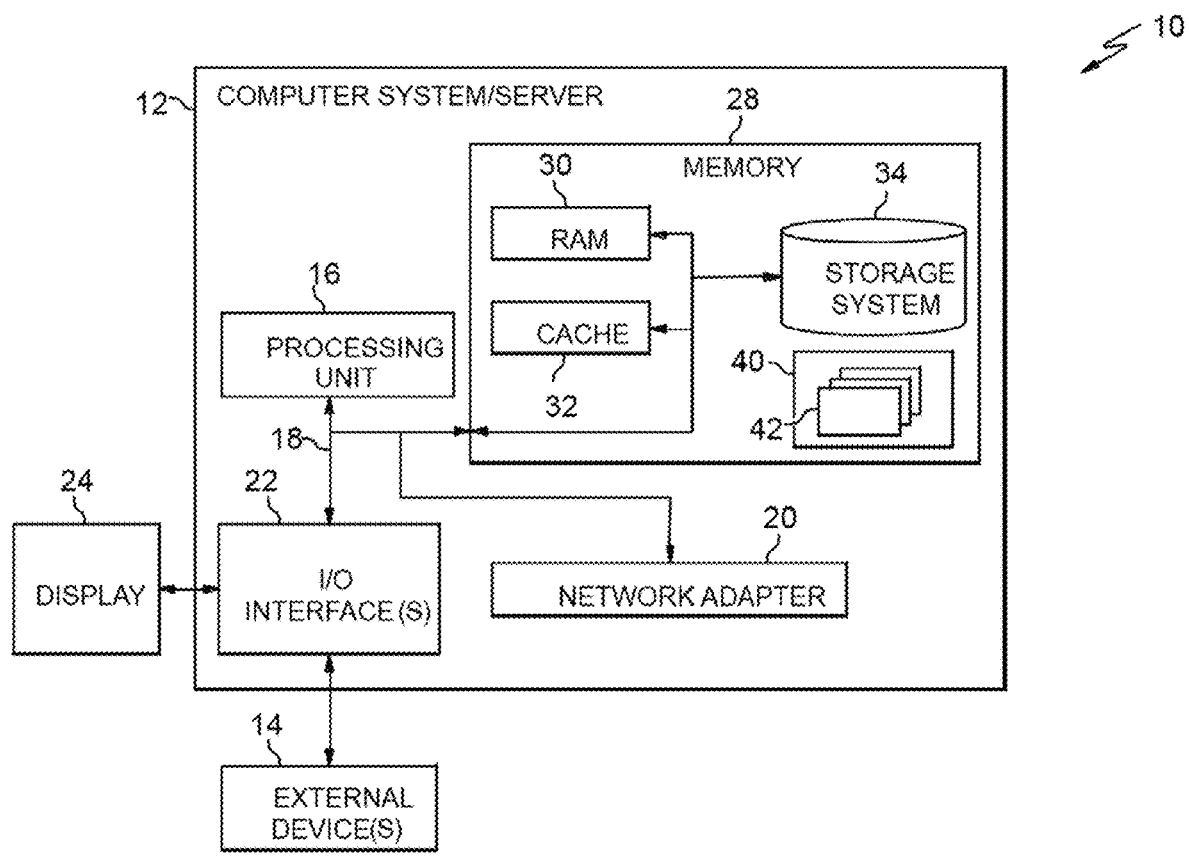
FIG. 1 depicts a cloud computing node according to an embodiment of the present invention.

The present invention relates generally to smart device systems and, more particularly, to the testing of automated smart device functions in a smart environment. According to aspects of the invention, a remote home automation service provider executes different types of test cases related to smart device control functions for different types of critical events (e.g., emergencies), and determines if the functions can be performed successfully during the critical situations. The term test case as used herein refers to program instructions including a set of instructions for initiating the testing of functions of one or more smart devices or systems (hereafter smart device 122) within a smart environment (e.g., smart home). In one example, internet-of-things (IOT) control functions may be initiated by a smart device controller during an emergency (e.g., strong winds) include closing windows of a dwelling, filling drinking water containers, and starting emergency generators.

In embodiments, the service provider initiates the execution of a test case at a location after ensuring that participants (people) will not be disturbed during the execution of the test case. In implementations, the time of the execution of the test cases will be decided by the service provider based on predicted timing of a critical event (e.g., a coming hurricane), severity of the critical situation, duration of the critical situation, etc., so that any defect or failure determined during the tests are identified early enough to enable timely remediation of the defect or failure. In embodiments, the frequency of test cases executed and the selection of test cases is identified dynamically by the service provider based on reliability of the smart device controller and service performance of the smart device controller where a test case needs to be executed.

In implementations, the service provider gathers smart device data related to actual critical events from multiple sources and utilizes this data to determine optimum test case functionality for a given type of critical event. For example, the service provider may gather crowd-sourced smart device data from multiple smart home systems during a hurricane to determine smart home functions most relevant to a hurricane and generate test cases configured to test those smart home functions in advance of future hurricanes.

Implementations of the invention derive important smart device command functions for specific critical events via aggregate data analysis; utilize these command functions to build event-specific test cases; determine a time period needed for remediation of any failed smart device command functions in the event-specific test cases; determine an acceptable time to execute the event-specific test cases at a location; and dynamically schedule and execute the event-specific test cases at the location based on real-time and upcoming critical events (e.g., weather-related events).

In implementations, the invention provides a computer-implemented method for execution of test cases in a smart home system, the method comprising: deriving one or more IOT commands that are important during an event; predicting which of a plurality of IOT devices a user will interact with during the event; building a test case for the event based on the derived one or more IOT commands and the predicted IOT devices; detect how much time is needed for repair as a result of a failed test case; analyze historical data to predict the user's location and needs; dynamically schedule execution of the test case for the derived one or more IOT commands based on the user's predicted location and needs to reduce interruption of service to the user during execution of the test case.

In embodiments, the timing of execution of the test case is determined based on predicted timing of any critical situation, severity of the critical situation, and duration of the critical situation so that sufficient repair time is allocated. In implementations, a frequency of test case execution, selection of test cases to execute, and interaction with the user during execution of the test cases are identified dynamically based on reliability of a device under test in the smart home system and service performance of the device under test. In embodiments, deriving the one or more IOT commands includes capturing interactions with one or more individuals and groups during an overlap of events.

Advantageously, embodiments of the invention provide improvements to the functioning of smart devices within a smart environment and to the technical field of intelligent systems. More specifically, aspects of the invention utilize unconventional steps of scheduling and implementing test cases within a smart environment based on real-time information such as a pending critical event and the presence or absence of one or more participants within the smart environment. Thus, a technical solution to the technical problem of ensuring a smart environment is fully functional in advance of a critical event is provided.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
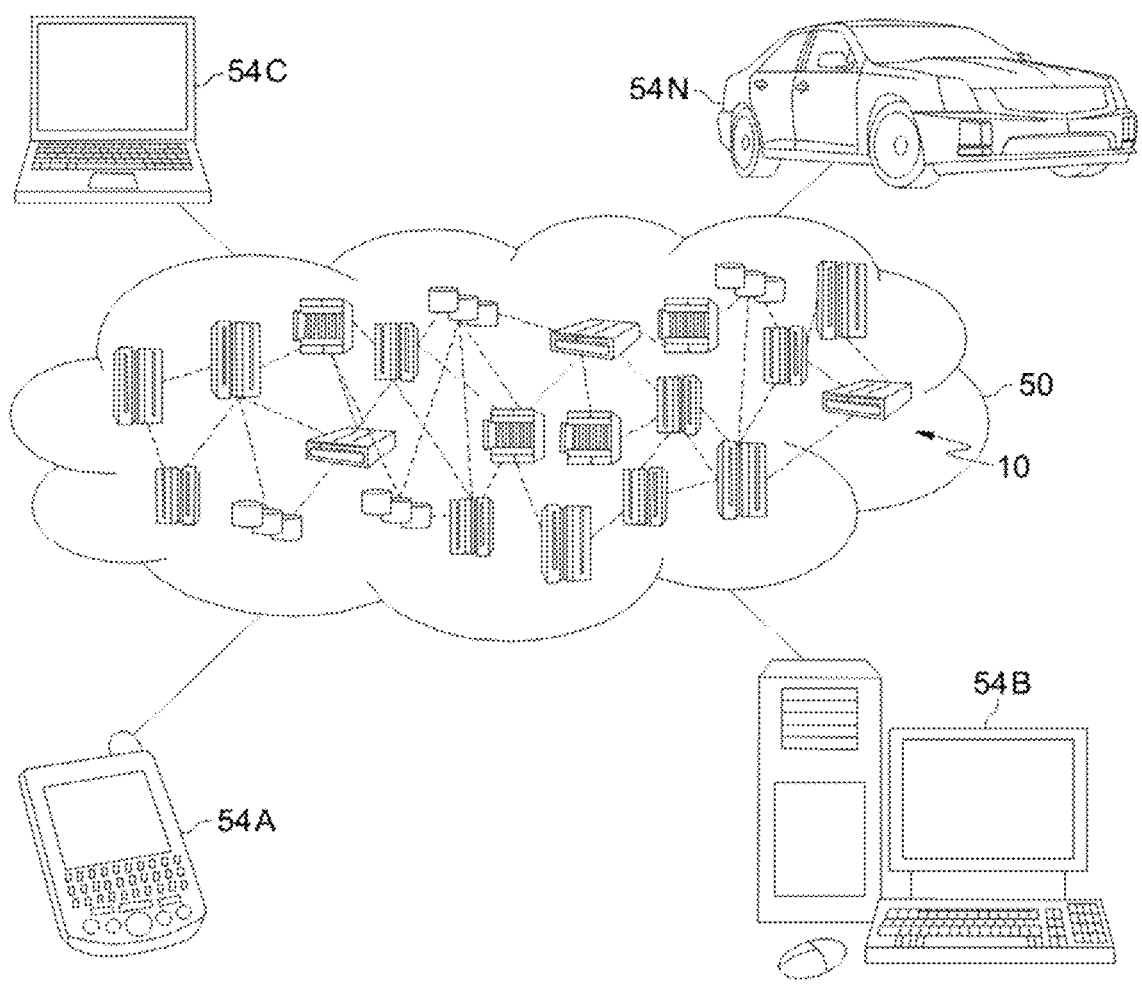
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
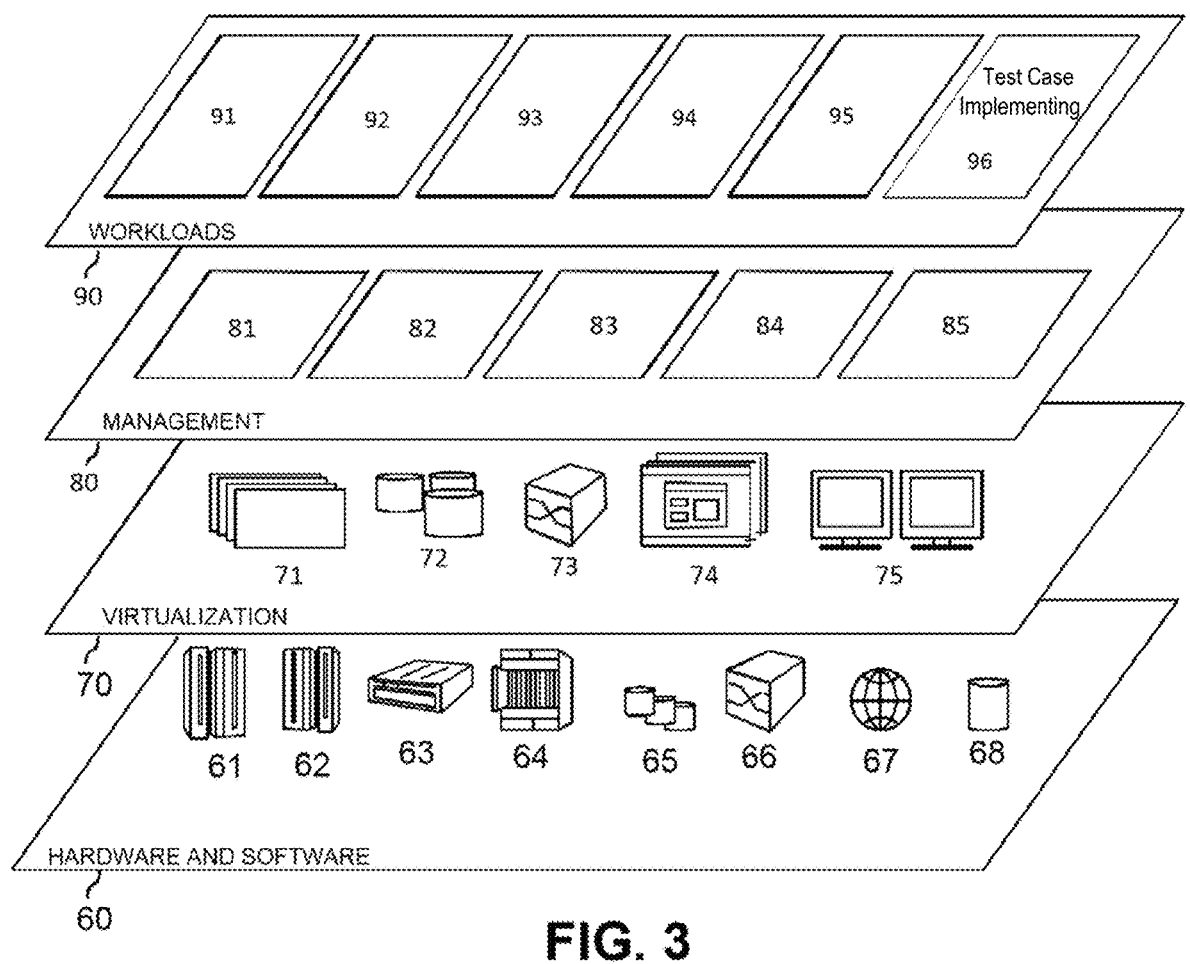
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test case implementing 96.

Implementations of the invention may include a computer system/server 12 of FIG. 1 in which one or more of the program modules 42 are configured to perform (or cause the computer system/server 12 to perform) one of more functions of the test case implementing 96 of FIG. 3. For example, the one or more of the program modules 42 may be configured to: derive one or more test cases for critical event types based on historic event data; determine test cases are a match for a participant; determine if test cases may be initiated (e.g., based on a presence or absence of a participant); execute test cases at a smart location; determine testing errors; issue notifications of testing errors; and record readiness of smart devices at a smart environment.

Figure 4:
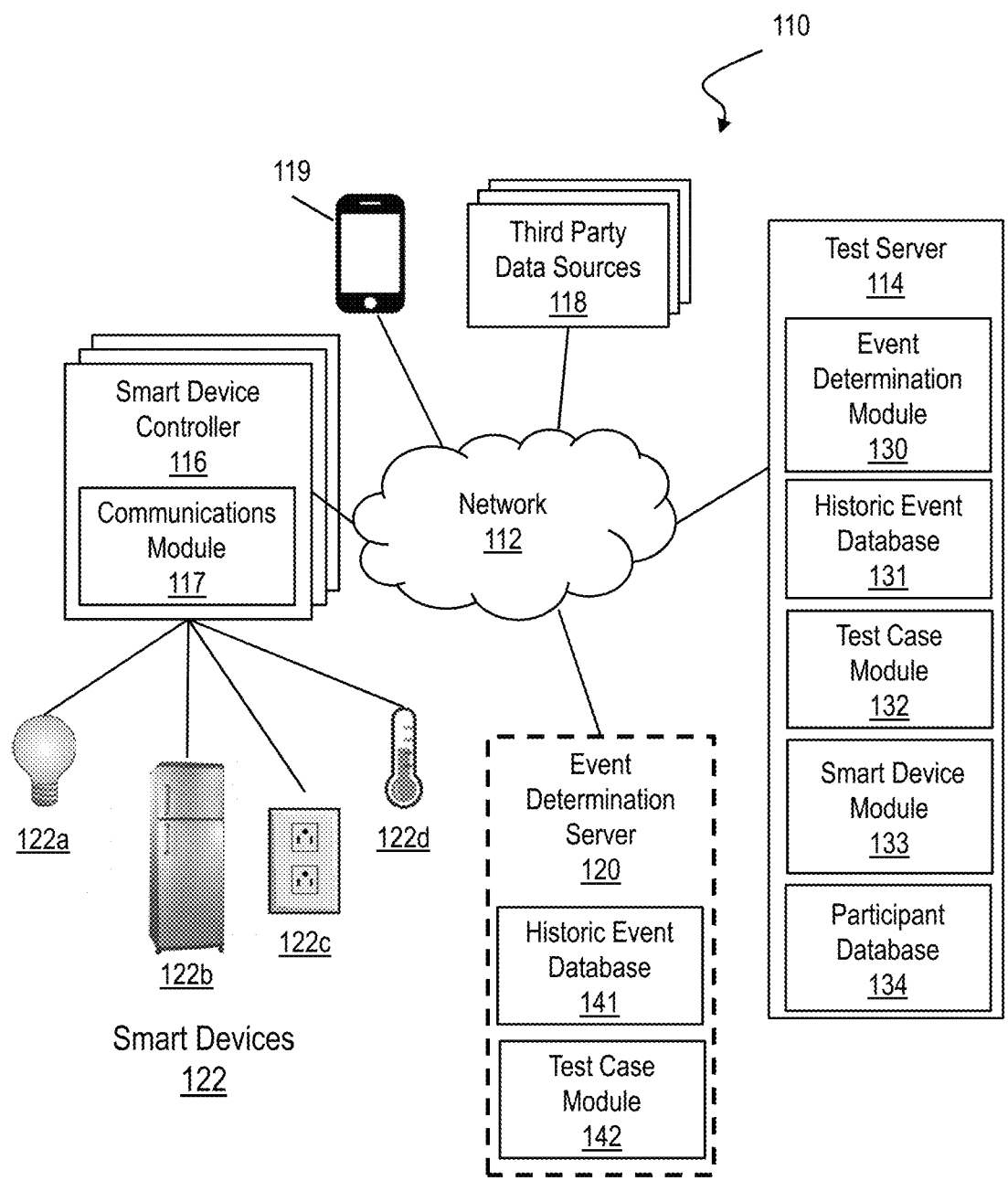
FIG. 4 shows a block diagram of an exemplary environment according to an embodiment of the present invention.

FIG. 4 shows a block diagram of an exemplary environment 110 according to an embodiment of the present invention. In embodiments, the environment 110 includes a network 112 enabling communication between a test server 114, one or more smart device controllers 116; one or more third party data sources 118, and one or more user computer devices 119. In certain implementations, the test server 114 is in communication with an event determination server 120. The test server 114 may comprise a computer system 12 of FIG. 1 and may be connected to the network 112 via the network adapter 20 of FIG. 1. The test server 114 may be configured as a special purpose computing device that is part of a home automation service provider. For example, the test server 114 may be configured to receive smart device data from a plurality of remote participants and selectively initiate the execution of test cases at the smart device controllers based on actual or anticipated critical events (e.g., predicted extreme weather events).

The network 112 may be any suitable communication network or combination of networks, such as a local area network (LAN), a general wide area network (WAN), and/or a public network (e.g., the Internet). The smart device controllers 116 may be configured to implement functions automatically and/or based on user input (e.g., voice commands). The smart device controllers 116 may include components of the computing device 12 of FIG. 1 and may be in the form of special computing devices (e.g., intelligent systems) configured to control automated functions of devices in a smart environment. For example, a smart device controller 116 may be configured to initiate functions of one or more smart devices 122 in a smart home or smart business environment.

The term smart environment as used herein refers to a location (e.g., a home or building) including one or more smart devices 122 (e.g., IOT devices) controlled by one or more smart device controllers 116 via a network (e.g., local wireless network), wherein functions of the one or more devices may be controlled by the smart device controller 116 based on rules and/or manual input of users. Examples of smart devices (e.g., TOT devices) 122 that may be utilized in a smart environment include lighting or lighting controls 122a, smart appliances 122b, smart electrical outlets or electrical outlet controls 122c, and temperature control devices 122d (e.g., smart thermostats). In implementations, one or more smart device controllers 116 may be associated with a particular location. For example, smart device controllers 116 of the present invention may include a smartphone and personal computer each configured to remotely control lighting, heating, and/or electrical devices within a smart environment. Moreover, a smart device controller 116 may be part of a smart device itself or part of a smart device system, such as a controller for a security system, energy management system, lighting control system, temperature control system, or the like. In implementations, smart device controllers 116 include a communications module 117 configured to communicate with the test server 114. In embodiments, one or more test cases from the test server 114 are received by a communications module 117 of a smart device controller 116 during the test server's execution of the one or more test cases.

The third party data sources 118 may include a variety of data source types, including databases and servers configured to provide data relevant to the implementation of test services by the test server 114. In one example, the third party data sources 118 include at least one source for weather-related data, emergency related data, or scheduling data for a location (e.g., calendar data for a business indicating scheduled power outages).

The user computer devices 119 may include components of the computer system 12 of FIG. 1, and may be in the form of a laptop, tablet, smartphone, smartwatch, desktop computer or other computing device. In implementations, the test server 114 is configured to send notifications to one or more of the user computer devices 119 to notify participants of test results from test cases implemented at smart environments associated with the respective participants.

In implementations, the event determination server 120 is configured provide the test server 114 with critical event data and/or testing-related data. For example, in embodiments, the event determination server 120 is configured to obtain smart device data from a plurality of smart device controllers 116, obtain critical event data from one or more third party data sources 118, and generate test cases for various types of critical events for use by the test server 114. The event determination server 120 may include components of the computing device 12 of FIG. 1 and may be in the form of an artificial intelligence (AI) computing device.

Still referring to FIG. 4, the test server 114 may include one or more program modules (e.g., program module 42 of FIG. 1) configured to perform one or more functions described herein. In embodiments, the test server 114 includes an event determination module 130 configured to identify historic events of interest (e.g., critical events such as emergency weather events), obtain related smart device data from smart devices 122 at multiple locations, and save the data in a historic event database 131.

In implementations, the test server 114 includes a test case module 132 configured to derive one or more test cases for one or more types (e.g., wind storm, blizzard, etc.) of the historic events of interest (e.g., historic critical events). In implementations, the test case module 132 receives test cases from the event determination server 120.

In embodiments, the test server 114 includes a smart device module 133 configured to selectively execute test cases at participant locations (smart environments), determine if results of the test cases indicate the need for remediation based on one or more failed tests, and issue notifications regarding the one or more failed tests. In implementations, the smart device module 133 is configured to: determine if one or more test cases are a match for a participant/smart environment; initiate communication with one or more smart device controllers 116 of the participant/ smart environment; determine if testing may be initiated based on participant data (e.g., whether the participant is at home); initiate one or more tests at the smart environment; and determine and record results of the tests received from the one or more smart device controllers 116 in a participant database 134.

In alternative embodiments, an event determination server 120 remote from the test server 114 performs one or more functions of the test server 114. In embodiments, the event determination server 120 is configured to identify historic events of interest (e.g., emergency weather events), obtain related smart device data from smart devices 122 at multiple locations, and save the data in a historic event database 141. In implementations, a test case module 142 of the event determination server 120 is configured to derive one or more test cases for one or more types (e.g., wind storm, blizzard, etc.) of the historic events of interest. In implementations, the test server 114 obtains test cases from the event determination server 120 and selectively executes the test cases at one or more smart device controllers 116 to cause the smart device controllers 116 to initiate the testing of smart device functions at one or more participant locations.

The quantity of devices and/or networks in the environment 110 is not limited to what is shown in FIG. 4. In practice, the environment 110 may include additional devices and/or networks; fewer devices and/or networks; different devices and/or networks; or differently arranged devices and/or networks than illustrated in FIG. 4. Also, in some implementations, one or more of the devices of the environment 110 may perform one or more functions described as being performed by another one or more of the devices of the environment 110. Devices of the environment 110 may interconnect via wired connections, wireless connections, or a combination of wired and wireless connections.

Figure 5:
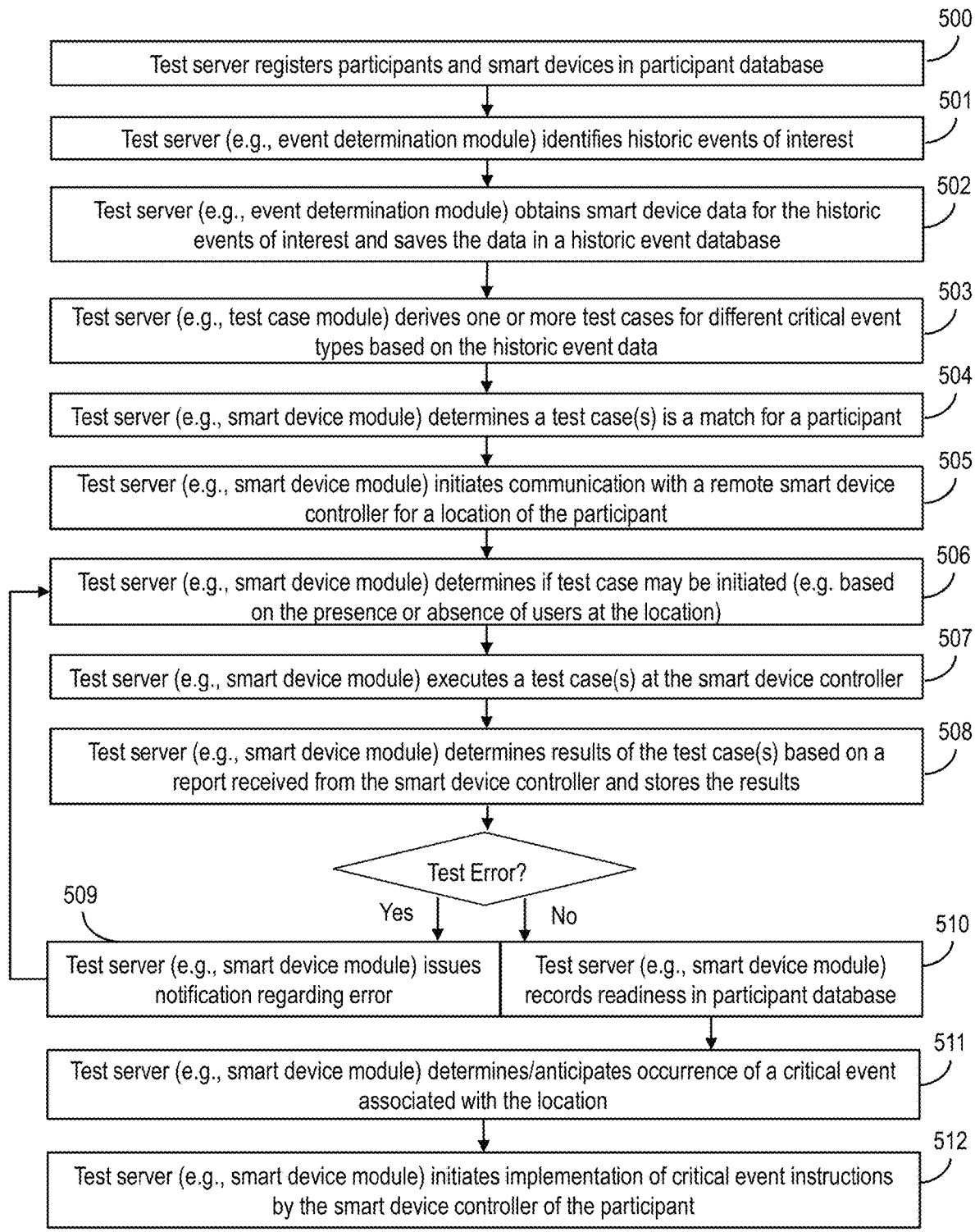
FIG. 5 shows a flowchart of an exemplary method according to an embodiment of the present invention.

FIG. 5 shows a flowchart of an exemplary method according to an embodiment of the present invention. Steps of the method may be carried out in the environment of FIG. 4 and are described with reference to elements depicted in FIG. 4.

At step 500, the test server 114 registers participants and associated smart device controllers 116 and smart devices 122 (e.g., IOT devices) of the respective participants and saves the registration data in the participant database 134. Registration information may include, for example, one or more smart device controllers 116 of a participant, the type (e.g., make and model) of the smart device controllers 116, smart devices 122 of the participant, the type (e.g., make and model) of the smart devices 122, the location of the participant (e.g., home address), and user preference, permissions, and/or security data.

To the extent that implementations discussed herein collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

At step 501, the test server 114 identifies historic events of interest (e.g., historic critical events). In implementations, the event determination module 130 of the test server 114 identifies historic events of interest such as extreme weather events, power outages, and/or other critical events, and gathers data related to the historic events of interest. In aspects, the term critical events as used herein refers to rare, unexpected or extreme events (e.g., emergency events, extreme weather events, utility outages, etc.). In embodiments, a critical event is an event which has been determined to cause a significant deviation in the usage of smart devices 122 at one or more smart environment locations or for one or more category of participants within a participant network. For example, a critical event may be an extreme weather event that causes smart environments within the influence of the extreme weather event (the category of participant being those influenced by the weather event) to initiate functions or combinations of functions which deviate from standard functions of the smart environments, such as the use of automatic shutter closing functions and/or automatic electrical generator functions. In another example, a critical event may be a scheduled event, such as an infrequent business event requiring more smart device resources than are usually utilized. In alternative embodiments, the historic events of interest are identified at step 501 by the event determination server 120 remote from the test server 114. Step 501 may be conducted on a continuous or periodic basis.

The historic events of interest may be determined based on a combination of data sources, such as data obtained by one or more participants including smart device usage data, smart environment sensor data, calendar data, email data, or other types of participant data. The test server 114 or event determination server 120 may determine a critical event based on user input indicating that a critical event has occurred. For example, a user can manually input extreme weather events at the test server 114, or the test server 114 may obtain participant data from one or more smart device controllers 116 indicating that a critical event has occurred. In embodiments, the test server 114 or event determination server 120 is configured to obtain critical event data from one or more of the third party data sources 118. The test server 114 may utilize web crawling tools to gather weather related data from a weather data source to determine when and where critical events such as extreme weather events have occurred. In one example, a web crawling tool of a test server 114 obtains data related to a historic hurricane event, determines the location of the event, determines the duration of the event, and determines the severity of the event.

At step 502, the test server 114 obtains smart device data (e.g., TOT device data) for the historic events of interest (historic critical events) and saves the smart device data in the historic event database 131. In embodiments, the event determination module 130 of the test server 114 obtains the smart device data. The smart device data may include smart device functions implemented by the smart device controller (automatically or based on user input) within a particular smart environment during a critical event. In alternative embodiments, smart device data for the historic events of interest may be obtained in accordance with step 502 by the event determination server 120 and stored in the historic event database 141. In implementations, steps 501 and 502 are performed together. For example, the test server 114 may obtain smart device data and, based on an analysis of the smart device data, determine that a significant change in smart device 122 usage indicates a historic event of interest (e.g., a significant increase in robot usage for a period of time in a smart business environment indicates a critical event occurred). In implementations, the test server 114 and/or the event determination server 120 analyzes historic events of interest and associated smart device data and associates one or more smart device commands with a critical event type based on the historic event data to generate test case data, and saves the test case data in the historic event database 141 of the event determination server 120 and/or the historic event database 131 of the test server 114 as test case data.

At step 503, the test server 114 derives one or more test cases for different critical event types based on the data (e.g., test case data) stored in the historic event database 131, and stores the test cases. In implementations, the test case module 132 of the test server 114 implements step 503. In alternative embodiments, the test case module 142 of the event determination server 120 derives the one or more test cases for the different critical event types in accordance with step 503. In embodiments, the test case module 132 obtains historic event data from the historic event database 141 of the event determination server 120.

The term test case as used herein refers to program instructions including a set of instructions for initiating one or more tests of one or more smart device 122 functions within a smart environment. In embodiments, the test server 114 gathers smart device data (e.g., activity logs) for one or more smart environments from the historic event database 131 or the historic event database 141 and determines correlations between types of critical events and smart device functions using a machine learning algorithm in order to determine which smart device functions should be tested for particular critical events. In aspects, a virtual assistant (e.g., test case module 132) of the test server 114 correlates location of IOT devices with test data of TOT devices, learns a participant's actions with respect to the TOT devices and derives new test cases for the location. A variety of correlation tools and methods may be utilized in the implementation of step 503. Examples of correlations that may be determined by the test server 114 include determining that during certain critical weather events (e.g., strong winds) windows are to be closed, drinking water receptacles are to be filled, external electrical power connections are to be switched off, refrigerators are to be disconnected, televisions are to be turned off, etc. In one example, the test server 114 may determine based on historic event data that participants ask their smart device controllers 116 to tell them the amount of gas in their backup generator more during hurricane season, may determine that the participants tend to care more about this TOT interaction during an emergency situation, and may derive a test case for testing backup generator functions for hurricanes or related critical events based thereon.

In implementations, the test server 114 derives test cases in order to ensure automation systems (e.g., smart home and smart business systems) can properly handle a critical event, can identify the workflow of an implemented test, and can determine the sequence of activities (functions) initiated by the test case. In aspects, the test case includes program instructions to initiate one or more functions of one or more smart devices 122 at a location (smart environment), program instructions to obtain data indicating whether the implementation of the one or more functions was successful or unsuccessful (e.g., pass or fail), and program instructions to return test data to the test server 114 including data indicating whether the one or more functions were implemented successfully or were unsuccessful. Implementations of the present invention are not limited to a particular format or implementation of the test cases.

Test cases may be derived for specific types of critical events, specific types (e.g., make and model) of smart devices 122 and smart device controllers 116, specific geographic regions, and/or based on one or more other categories. In implementations, test cases are derived for categories of weather or environmental-related critical events such as hurricanes, blizzards, heat waves, etc. Test cases may be generated that are specific to a particular participant, specific to a particular group of participants, and/or that are generic to a category of participant, geographic region, critical event, etc. In implementations, test cases provide instructions to run test functions for one or more smart devices 122 including smart device controllers 116 that control functions of attached electronic devices (e.g., a smart controller for a heating system). Examples of smart devices include smart appliances (e.g., smart refrigerator), garage door controllers, window or shutter controllers, lighting controllers, smart electrical outlets, power generator controllers, water controllers, solar panel controllers, security controllers, door lock controllers, wi-fi controllers, sprinkler system controllers, and others. A variety of smart devices 122 may be tested in accordance with embodiments of the invention, and aspects of the invention are not intended to be limited to the examples provided herein.

At step 504, the test server 114 determines that one or more test cases are a match for a smart environment of a participant. It should be understood that the test server 114 may determine that one or more test cases are a match for multiple participants at the same time. However, for the purpose of discussing method steps of FIG. 5, only a single participant is referenced. In implementations, the smart device module 133 of the test server 114 implements step 504. In aspects, the test server 114 determines that a test case is a match for a smart environment of a participant based on one or more of: a smart device 122 of the test case matching (e.g., same make/model) a smart device 122 of the smart environment; a critical event of the test case matching a critical event associated with the smart environment (e.g., an approaching weather event or scheduled business event); and participant usage data from the smart environment (e.g., how the participant utilizes smart devices 122 within the smart environment) matching historic participant usage data associated with the test case.

In embodiments, the test server 114 determines that a test case determined at step 504 for a type of critical event matches a participant when the test server 114 predicts an occurrence of a critical event of a type matching the test case. For example, in implementations, the test server 114 "scrapes" the web and historic event databases (e.g. databases 131 and 141), utilizing a discovery tool (e.g., Watson Discovery™ of International Business Machines Corporation (IBM®)), using particular geolocation data (e.g., city or state) to detect an uptick in specific environmental conditions such as a cool front or snow storms meeting a threshold (e.g., snow predicted of more than 1 foot). In implementations, application programming interfaces (APIs) such as APIs of The Weather Company® of International Business Machines Corporation (IBM®), may be utilized to gather external information surrounding an environmental event. In implementations, the test server 114 does not predict a critical event itself (e.g., earthquake, fire tsunami, etc.) but receives information about a critical event from another server (e.g., the event determination server 120). In such cases the test server 114 does not predict the critical event, but presents correlated test cases for a situation and critical event type matched to a participant. In another example, the test server 114 determines based on participant data (e.g., calendar data) that a critical business event is approaching, such as a yearly sale event or inventory event.

Once correlation between smart device functions and historic critical events is ascertained and test cases are derived at step 503, the test server 114 finds similar participants to the historic critical events, wherein the similar participants are in the same or similar environment (e.g., same time, location, or other), indicating that the similar participants are a match for a type of test case associated with a critical event. In embodiments, the test server 114 determines based on historic actions of a participant whether a test case is a match for the participant. For example, the test server 114 may determine based on historic event data in the historic event database 131 that a participant asks a smart device controller 116 an amount of gas in a backup generator more during hurricane season, the test server 114 may derive that the participant and other participants similar to the participant in the same area tend to care more about this IOT interaction during an emergency situation, and therefore determine that an associated test case (e.g., for the testing of a backup generator) be added to scheduled testing for the participant. In embodiments, multiple test cases are determined to be a match at step 504, and the test server 114 may determine a sequence of execution for the test cases based on stored rules, for example.

In embodiments, an AI tool of the test server 114 recognizes each smart device 122 at a particular location (smart environment) and identifies what activities are to be performed automatically during different types of critical situations. In implementations, the test cases associated with the activities to be performed are obtained by the test server 114 from the event determination server 120. In implementations, the test cases are chosen for a particular location by the test server 114: 1) when the test case has a valid match to a present local TOT device; 2) based on natural language processing (e.g., natural language classification/natural language understanding) of a user manual of each smart device 122; 3) based on a command similarity comparison and clustering analysis; and/or 4) based on a signal sent by the test server 114 to a smart device 122 to detect if a test case includes valid input for the smart device 122.

At step 505, the test server 114 initiates communication with a smart device controller 116 of the participant of step 504. In implementations, the smart device module 133 of the test server 114 implements step 505. Various methods of initiating communications between the test server 114 and the smart device controller 116 of the participant matching a test case may be utilized in the implementation of step 505. Step 505 may be performed concurrently with step 504.

At step 506, the test server 114 determines if testing may be initiated at the location (smart environment) of the participant. In implementations, the smart device module 133 of the test server 114 implements step 506. In aspects, the test server 114 utilizes default rules associated with a particular test case, geographic region, and/or participant, etc., in the implementation of step 506. In embodiments, the test server 114 accesses rules associated with a particular participant in the participant database 134 and utilizes the rules to determine when it is appropriate to initiate a test case at the location of the participant. In implementations, the test server 114 determines if a test case may be initiated at a smart environment based on real-time participant data from the smart environment (e.g., sensor data from one or more sensors of smart devices 122 within the smart environment or data from a user computer device 119 of the participant. In aspects, the test server 114 may learn rules for a participant over time based on user feedback during a testing event. For example, voice commands received by a smart device controller 116 at a smart environment may indicated that a user requested that one or more tests be terminated, and the test server 114 may create and save rules for that user based on their learned preferences from such interactions.

In implementations, the test server 114 utilizes historic event data to identify a downtime required for the execution of the test case(s) of step 504, and further identifies if the downtime will be problematic for the participant based on default rules or user profile data for the participant. In aspects, the test server 114 determines an optimum test schedule and/or time to execute one or more test cases from start to finish. The test server 114 may identify a time when one or more test cases can be executed at a location without bothering one or more participants by: detecting where users are located with respect to a smart environment, and detecting if the test cases are likely to generate noise or cause other disruptive activities. In implementations, the test server 114 identifies appropriate timing when one or more test cases may be executed based on the optimum time to execute the test case(s) from start to finish and the location of the users with respect to the smart environment.

In one example, the test server 114 schedules test cases associated with thunderstorms to be executed monthly during summer months, and only once during winter based on predetermined rules that take into consideration that thunderstorm readiness is more important in the summer months due to the increase in thunderstorm activity. In another example, a test case for a thunderstorm may require an external power source to a home to be disconnected but shutting off power when the participant is at home may be disruptive to the participant. In this example, the test server 114 determines, based on predetermined rules associated with electrical power control functions, that a test case requiring the disconnection of an electrical power source should not be implemented when the participant is at home. In yet another example, the test server 114 schedules test cases for fire emergencies to be executed once a year when the home occupants are gone based on predetermined rules that take into consideration the fact that fire emergencies are very extensive and destructive to home occupants, but have a lesser likelihood of occurring than a thunderstorm or blizzard. In implementations, the test server 114 receives information (e.g., sensor data) from the smart device controller 116 of a participant indicating whether the participant is at home (in the smart environment). In one example, a smart thermostat device controller (e.g., temperature controller 112d of FIG. 4) shares information with the test server 114 regarding whether the participant is at home in the implementation of step 506. In another example, the test server 114 may be granted access to participant information such as the participant's calendar or other participant data indicating a location of the participant (e.g., real-time smartwatch data) or indicating when the participant will be away from home (e.g., a calendar entry indicating that the participant will be on vacation), and may utilize the participant information in the determination of step 506.

In aspects, the timing/scheduling of the execution of one or more test cases by the test server 114 is determined based on the predicted timing of a critical event (e.g., anticipated arrival of a hurricane in the geographic region of the participant), the severity of the critical event (e.g., third party data sources 118 indicate a category 3+ hurricane), an anticipated duration of the critical event (e.g., third party data sources 118 indicate the hurricane will last 12-24 hours), an estimated time for remediating test failures at a location (e.g., 8 hours is typically needed to refill a gas generator according to saved rules), and/or other factors. Information utilized to schedule the execution of the test case may be based on predetermined rules, learned rules, third party data and/or real-time data received by the test server 114. The test server 114 may determine predicted critical events for a location, predicted timing of the critical events, predicted severity of the critical events and predicted duration of the critical events utilizing a web crawling tool (e.g., of the event determination module 130) to gather information from the third party data sources 118. In this way, embodiments of the invention provide a test server 114 that determines if testing may be initiated at the location of the participant in a manner that takes into account an estimated time needed to address any test failure before the critical event of interest occurs, thereby maximizes the benefits of the testing. Additionally, in implementations test cases are optimally scheduled and executed by the test server 114 in a manner that avoids undue wear and tear on the involved smart device controller(s) 116, smart devices 122, and related electrical or home components.

At step 507, the test server 114 executes one or more test cases at the smart device controller 116 of the participant. In implementations, the smart device module 133 of the test server 114 implements step 507. Various tools and methods for executing the test case(s) for implementation by one or more smart device controller 116 may be utilized in accordance with embodiments of the invention. When multiple test cases are executed, the test server 114 may execute the test cases in a predetermined sequence of execution. The sequence of execution may be based on stored rules or preferences.

At step 508, the test server 114 determines test results from the implementation of the one or more test cases at step 507 based on a report received from the smart device controller 116, and stores the results in the participant database 134. In implementations, the smart device module 133 of the test server 114 implements step 508. Various tools and methods for communicating test results from the implementation of one or more test cases may be utilized in accordance with step 508. In aspects, the communications module 117 of a smart device controller 116 communicates test results from the implementation of one or more test cases to the smart device module 133, and the smart device module 133 determines if functions associated with the one or more test cases (e.g., turning off power, starting a power generator, shutting a garage door) passed (were successful) or failed (were unsuccessful).

In embodiments, a smart device controller 116 receives usage data from a smart device 122 under test, and can either determine how the smart device 122 is performing and what types of problems are occurring, or pass on the usage data to the test server 114 for analysis (e.g., by the smart device module 133). In aspects, the usage data is processed by the smart device controller 116 and/or the test server 114 to determine current functional levels and outstanding error logs. The test server 114 may utilize a service report from an individual smart device 122 to identify a status/state of the smart device 122. The test data (e.g., usage data, service report) obtained by the test server 114 may be utilized by the test server 114 to validate current smart devices 122 (e.g., TOT devices) and determine if stored assumptions for those smart devices 122 match. In implementations, the test server 114 captures estimations regarding energy consumption of a smart environment and smart devices 122 therein during a critical situation based on test data received from the smart device controller(s) 116 in accordance with step 508.

At step 509, the test server 114 issues a notification regarding a failure or unsuccessful implementation of a function at the participant location, as necessary, based on the test results determined at step 508. In implementations, the smart device module 133 of the test server 114 implements step 509. Notifications may be generated by the test server 114 based on default rules, or participant specific rules (e.g., from the participant database 124). The notification may be in a variety of formats, such as an email notification, a text message notification, etc. The notification may be generated for distribution to the participant themselves (e.g., user computer device 119) and/or to a third party (e.g., a third party computing device not shown).

In one example, a notification is automatically generated by the test server 114 when a power generator test fails, wherein the notification is sent by the test server 114 to both the participant and a third party power generator servicer of record (according to participant rules in the participant database). In implementations, the test server 114 returns to step 506 after remediation of a test failure has been addressed or a predetermined amount of time has passed, wherein the test server 114 will determine if the test case may be initiated again for the participant in accordance with step 506.

In another example, a smart device controller 116 runs a test of a garage door system based on a test case initiated by the test server 114 in accordance with step 507 of FIG. 5. In accordance with step 508 of FIG. 5, the test server 114 determines that the garage door has limited opening and closing functionality based on a failed response from the door, which is communicated by the smart device controller 116 to the test server 114 after the test is conducted. The test server 114 issues a notification to the owner of the garage door system in accordance with step 509, and the owner now knows to replace garage door components to ensure that the garage door system is ready for an emergency event.

At step 510, the test server 114 records a readiness of the participant's smart environment (including one or more smart device controllers 116 and/or smart devices 122) in the participant database 134 based on the test results determined at step 508. In implementations, the smart device module 133 of the test server 114 implements step 510. In aspects, the readiness of the participant includes information regarding the date of the latest test case(s), the types of functions tested, and/or the results of the test(s) (pass or fail of functions). In aspects, if one or more test cases are executed successfully, the test server 114 does not alert a user regarding the test (e.g., does not alert the user that maintenance is needed).

Optionally at step 511, the test server 114 determines or anticipates a critical event associated with the location of the participant. In implementations, a web crawling tool of the test server 114 (e.g., event determination module 130) "scrapes" the web looking for information indicating a critical event is happening or is anticipated in real-time. In alternative embodiments, the test server 114 obtains real-time critical event information from the event determination server 120. For example, the test server 114 may determine that a hurricane is approaching a particular geographic region within which the participant is located based on information gathered by the test server 114 or obtained from the event determination server 120. In implementations, testing of one or more smart environments is initiated by the test server 114 based on the determination of an anticipated critical event in accordance with step 511. In embodiments, the test server 114 determines if a test case is a match for a participant based on the anticipated critical event, as discussed above with respect to step 504. In implementations, the test server 114 obtains information from a smart environment itself. In one example, the test server 114 obtains weather information for a smart environment from household and meteorological sensors (smart devices 122). In implementations, weather patterns are correlated with a test case and the test case may be executed by the test server 114 according to steps 504-507 of FIG. 5.

At step 512, the test server 114 automatically initiates implementations of critical event instructions by the smart device controller 116 of the participant based on the timing of the critical event. In embodiments, the smart device module 133 of the test server 114 implements step 512. In aspects, the critical event instructions are program instructions to initiate one or more functions of one or more smart devices 122 at the location, wherein the functions are the same or similar to the functions of an associated test case. For example, a test case for a hurricane would include the same instructions to initiate one or more functions of one or more smart devices 122 at the location, with the exception that the functions would not be in the form of a test (e.g., power would be turned off, but would not be turned back on as it would at the conclusion of a test case implementation).

Crowd-Sourced Data Capture Example

In implementations, crowd-sourced data from multiple smart environments is utilized by the test server 114 to implement steps of FIG. 5. In one example, a discovery tool output of the test server 114 indicates a spike in the following web terminology: "Austin Tex. Heat Wave, Emergency, Problems, Dangerous." Additionally, a weather API indicates that temperatures in Austin Tex. have been determined to be extreme. Thus, the test server 114 determines a critical event in the form of a heat wave in Austin, Tex. based on the discover tool output and API data. A group of similar participants (e.g., participants in Austin Tex.) is then identified by the test server 114 for this critical event. In this example, there are 5000 different individuals (homes and businesses) in Austin, Tex. signed up for smart device optimization services of the invention. The test server 114 performs smart device log detection and correlation in accordance with step 503 of FIG. 5. More specifically, the 5000 individuals connect their smart devices 122 (e.g., IOT devices) to a log engine of the test server 114 (e.g., event determination module 130), and historical information for each individual and the individuals as aggregates indicate a 25% increase in smart device commands pertaining to certain devices (e.g., air conditioning units). The test server 114 determines that there is a correlation in the influx of these commands when weather gets extreme. As such, the test server 114 determines that these commands are important to run successfully during the heat wave, and determines test cases to test functions of the devices in accordance with step 503 of FIG. 5.

Test Case Creation Example

In implementations, an IOT resiliency engine (e.g., test case module 132) of the test server 114 initiates the implementation of test cases at a participant location, and monitors for successful and unsuccessful test case results when an event determination server 120 or the event determination module 130 detects articles, content, or time thresholds predictive of an upcoming critical event (e.g., an IOT Device Risk Elevated Request is issued by the event determination server 120 or the event determination module 130). Unsuccessful test cases are used to notify the owner/participant of required maintenance to be acted upon to ensure proper execution of safety activities during an actual critical event/situation.

In a consumer example, the test server 114 determines that a blizzard is coming, and determines that for every year that temperatures dip below a threshold temperature, a participant uses their smart device controller 116 (AI home engine) to heat their apartment at a much higher temperature than usual, and the participant ensures that their oven is working (as they go out to eat less). The participant's smart device controller 116 may detect this trend, share the information with the test server 114, and run test cases to make sure that the participant's smart devices 122 are working in optimum condition based on commands received from the test server 114. In this scenario, these test cases are triggered and executed within close proximity to the upcoming potential critical event/situation to achieve relevancy and preparedness, but also allow for enough time to make fixes if needed. That is, it is undesirable to run test cases too early because something may change and fail between test case execution and an actual critical event/situation, but the test cases cannot be run too late where there is not enough time to make fixes and run maintenance when a test case fails.

In a commercial example, a shipping business utilizes robots (smart devices 122) to help in a warehouse location. Each robot has its log files written that detail the daily usage, which indicate that during a previous Black Friday event, the warehouse drones were not at max battery efficiency due to some old hardware, and this caused significant functional issues that lead to missed deadlines. This log is ingested by the test server 114, which determines that in November, there is heightened use of these drones where they need to be functional. The test server 114 detects November approaching the next year in accordance with step 504 of FIG. 5, and initiates test cases at the warehouse to test the battery efficiency levels of the robots in accordance with step 507 of FIG. 5. In this example, the test server 114 issues a notification to the warehouse owner indicating that multiple robots have inefficient batteries in accordance with step 509 of FIG. 5. Thereafter, the warehouse owner may replaces the inefficient batteries and is prepared for the upcoming Black Friday event (critical event).

Disturbance Probability Testing Example

In implementations, the test server 114 ensures that test cases are implemented at times that the smart devices 122 at issue have low historical frequency of use or at times when the implementation of the test cases will not disrupt users/participants. In one example, data captured by the test server 114 indicating low historical usage frequency of factory drones (smart devices 122) at a smart environment result in the test server 114 initiating test cases for a factory drone on an evening when there are no people around and the activity logs for the smart environment show no historical usage at that time. In a household, the test server 114 may determine low historical usage frequency of one or more smart devices 122 by capturing the details of smart device interactions and if they engage a physical system. If a physical system (sound, light, motion) are activated, the test server 114 may communicate via known methods to a smart household system (e.g., smart device controller 116) to determine the presence of users. In implementations, smart watches, mobile devices, etc. may be detected by the smart device controller 116 and communicated to the test server 114 for the test server 114 to determine if users are in the room/area the test will be running. In aspects, if users are present, then the test server 114 will delay the test, else the test will be activated by the test server 114.

In implementations associated with critical events, the timing of execution of the test cases may be decided by the test server 114 based on predicted timing of any critical situation, severity of the critical situation, duration of the critical situation, etc., so that if any defect or failed test result is identified by the test server 114, proper repairing time is available. The test server 114 may utilize Web crawling functions in order to gather critical event information required to make timing determinations. In one example, timing determinations involve two data sources; a web crawler such as Watson Discovery™ of International Business Machines Corporation (IBM®), and smart device 122 activity logs. In implementations, these two sources of data are correlated by the test server 114 to determine association of commands and interactions during the critical event. Critical events can be anything from higher frequency usage days to actual emergencies such as storms, blizzards, etc. The test server 114 may also capture the length of time it takes to fix and ingest this emergency event data into the test server 114 (e.g., event determination module 130) to determine how long before a predicted event the test server 114 needs to test smart devices 122.

Thus, systems of the invention enable: the determination of a probability of disturbing participants during IOT device test case initiation; the determination of optimum testing windows by ingesting historical repair time, amount of warning/indicators before a critical event; and the correlation of vocalizations and manual interruptions of test cases for test case timing and optimum selection. User input to a smart environment (e.g., voice commands for a smart device controller 116) may create a feedback loop for the test server 114 to learn preferences of the user and optimize testing at the smart environment.

Figure 6:
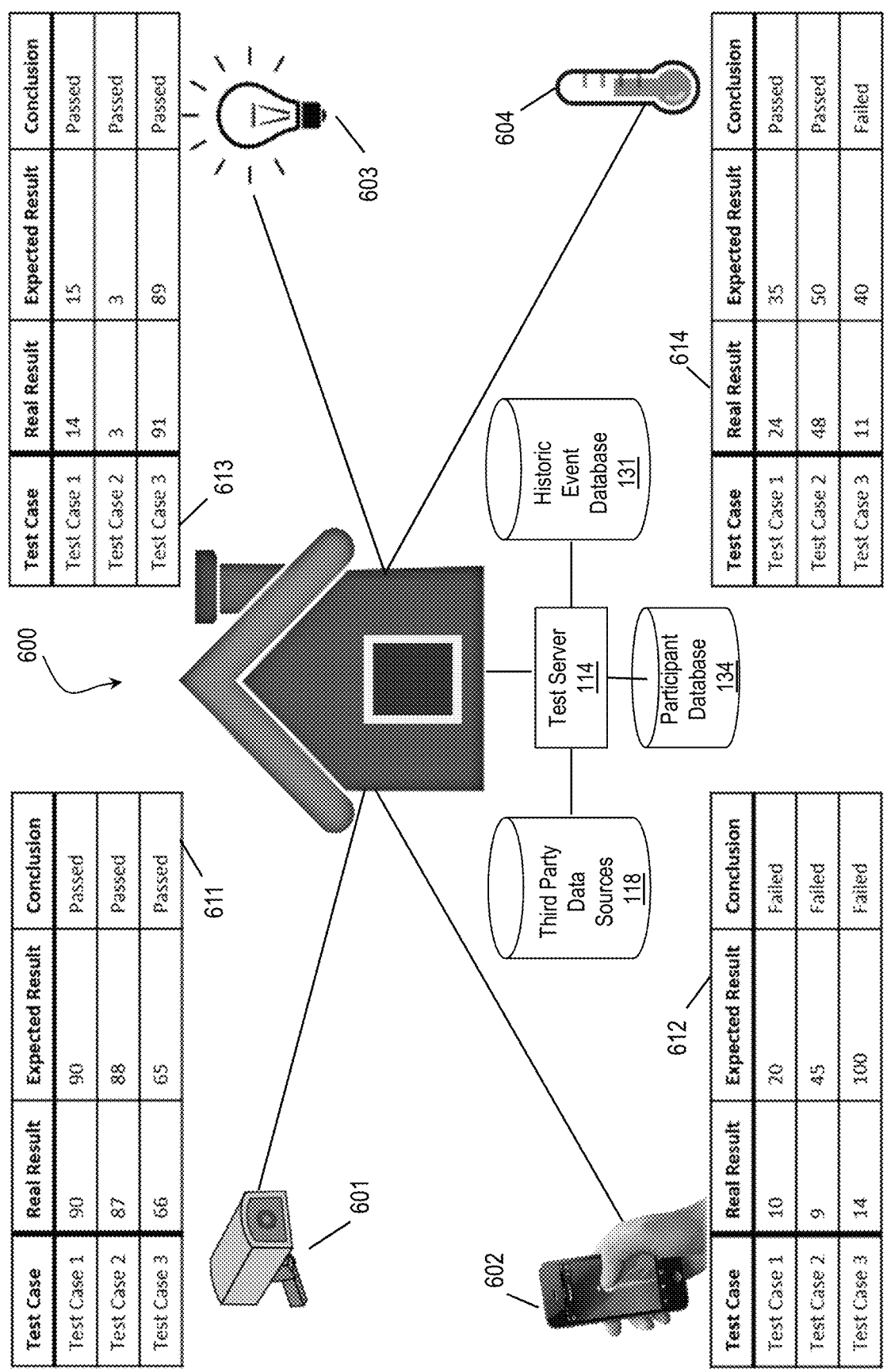
FIG. 6 depicts a test case implementation scenario according to an embodiment of the present invention.

FIG. 6 depicts a test case implementation scenario according to an embodiment of the present invention. Steps illustrated in FIG. 6 may be carried out in the environment of FIG. 4 and are described with reference to elements depicted in FIG. 4 and in accordance with the method steps of FIG. 5.

In the scenario of FIG. 6, a smart home environment 600 includes a number of smart devices 122 including a security system 601, an emergency management system 602, a lighting control system 603, and a temperature control system 604. In the scenario of FIG. 6, the test server 114 is in communication with one or more smart device controllers 116 (not separately shown) configured to control the smart device systems 601-604. In the example shown, the test server 114 determines that a hurricane is approaching based on data supplied by the third party data sources 118. The test server 114 accesses historic event data in the historic event database 131, and determines that smart homes in the geographic region associated with the smart home environment 600 (e.g., homes within a predetermined distance from the smart home environment or homes located in similar environments) utilized a plurality of smart devices 122 at increased levels and/or in particular ways during similar historic weather conditions (e.g., past hurricanes). Based on this historic event data, the test server 114 derives one or more test cases in accordance with step 503 of FIG. 5 and stores them in the historic event database 131.

In the scenario of FIG. 6, the test cases derived by the test server 114 include test cases for a number of different types (e.g., makes and models) of security systems, emergency management systems, lighting control systems and temperature control systems. The test server 114 determines test cases that match the smart home environment 600 in accordance with step 504 of FIG. 5. Specifically, the test server 114 determines test cases for the make and model of the security system 601, test cases for the type of emergency management system 602, test cases for the type of lighting control system 603, and test cases for the make and model of the temperature control system 604 based on user registration information from the participant database 134 and/or data received from the smart device systems 601-604 including system identification information (e.g., make and model). The test server 114 determines that a participant associated with the smart home environment 600 has indicated in their registration information that they prefer testing to be done when they are not home. The third party information derived by the test server 114 indicates that the hurricane may likely hit within two days. Information received by the test server 114 from one or more of the smart devices/systems 601-604 (e.g., security system information from the security system 601) indicates that the participant is not at home. Accordingly, the test server 116 determines that the test cases may be implemented for the smart systems 601-604, and executes that test cases to initiate testing of the smart systems 601-604 in advance of the anticipated hurricane. Results of the tests are displayed in tables 611-614.

As illustrated in table 611 of FIG. 6, three test cases are implemented for the security system 601, and test results delivered back to the test server 114 from the security system 601 indicate that all of the test cases passed. In the case of the security system 601, the real results (i.e., 90, 87 and 66) from the tests implemented for each of the test cases 1-3 are within a predetermined acceptable range of expected (acceptable) results (i.e., 90, 88, and 65).

Additionally, three test cases are implemented for the emergency management system 602, and test result delivered back to the test server 114 from the emergency management system 602 indicate that all of the test cases failed, as illustrated in table 612. In the case of the emergency management system 602, the real results (i.e., 10, 9, 14) from the tests implemented for each of the test cases 1-3 are not within a predetermined acceptable range of expected results (i.e., 20, 45, 100). In the example of FIG. 6, the test server 114 sends a notification to the participant associated with the smart home environment 600 to notify them that the test(s) for test case 1-3 failed.

Three cases are also implemented for the lighting control system 603, and test result delivered back to the test server 114 from the lighting control system 603 indicate that all of the test cases passed, as illustrated in table 613. In the case of the lighting control system 603, the real results (i.e., 14, 3, 91) from the tests implemented for each of the test cases 1-3 are within a predetermined acceptable range of expected results (i.e., 15, 3, 89).

As a final example, three test results are also implemented for the temperature control system 604, and test results delivered back to the test server 114 from the temperature control system 604 indicate that two of the test cases passed and one failed, as illustrated in table 614. In the case of the temperature control system 604, the real results (i.e., 24, 48) from the tests implemented for the test cases 1-2 are within a predetermined acceptable range of expected results (i.e., 35, 50), while the real results (i.e., 11) from the test implemented for test case 3 are outside of a predetermined range of expected results (i.e., 40). In the example of FIG. 6, the test server 114 sends a notification to the participant associated with the smart home environment 600 to notify them that the test(s) for test case 3 failed.

Figure 7:
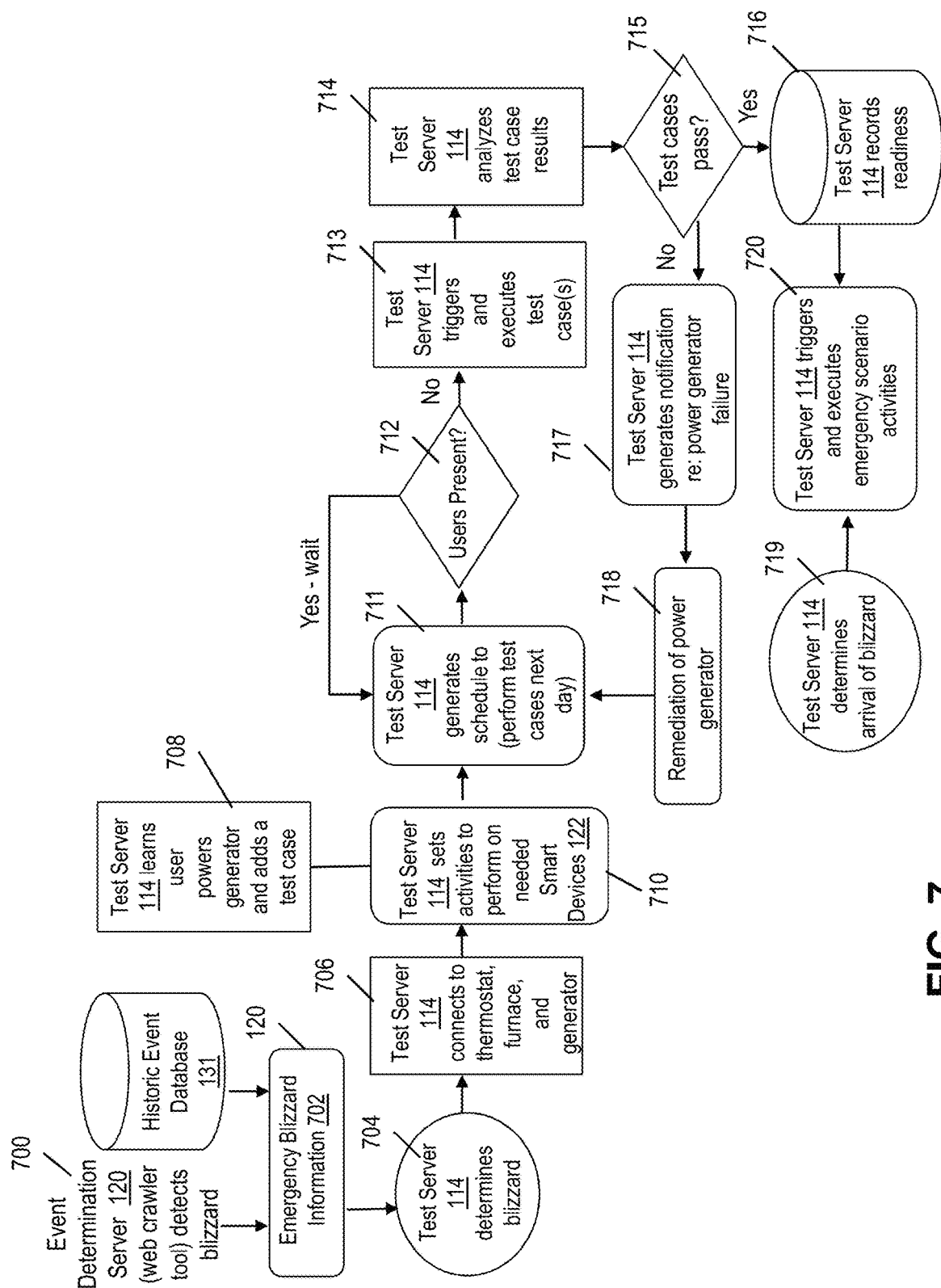
FIG. 7 depicts an exemplary use scenario according to an embodiment of the present invention.

FIG. 7 depicts an exemplary use scenario according to an embodiment of the present invention. Steps illustrated in FIG. 7 may be carried out in the environment of FIG. 4 and are described with reference to elements depicted in FIG. 4 and in accordance with the method steps of FIG. 5.

In the scenario of FIG. 7, the event determination server 120 utilizes a web crawler tool to detect the approach of a blizzard with respect to a particular geographic region at 700. The event determination server 120 also obtains historic event data from the historic event database 131, wherein the historic event data indicates the usage frequencies of IOT devices during prior blizzards. Emergency blizzard information 702 (including information regarding the approaching blizzard and the historic IOT device usage) is gathered by the event determination server 120 and sent to the test server 114, which determines at 704 that a blizzard is anticipated for the geographic region. At 706 the test server 114 connects to a smart home environment of a user within the geographic region, which includes connecting to a thermostat, furnace and a power generator. At 708, the test server 114 learns that the user utilizes a particular power generator, and adds a test case for the power generator to the user profile (e.g., in the participant database 134 of FIG. 4).

At 710, the test server 114 determines activities to be performed on smart devices 122 at the smart environment based on the approaching blizzard, and the associated test cases, including the test case for the power generator. The test server 114 then evaluates whether the test cases may be initiated in accordance with step 506 of FIG. 5. In the example of FIG. 7, the test server 114 generates a schedule to perform text cases the next day at 711. On the next day, the test server 114 determines based on input from the smart home environment whether the user is present at step 712. The test cases are not implemented until the test server 114 determines that the user is not at home, then triggers and executes the test cases for the smart environment at 713.

At 714, the test server 114 analyzes test results received from the smart environment (e.g., test results from the test case implementing functions of the power generator). The test server 114 determines whether the smart devices or systems of the smart environment functioned successfully (passed the test) or did not function successfully (failed the test) at 715. If the test results indicate that the tests were successful, the test server 114 records readiness of the smart environment and/or smart devices within the smart environment at 716. In the example of FIG. 7, the test server 114 generates a notification at 717 that the power generator test failed (i.e., the test case for the power generator lead to failed test results).

In the scenario of FIG. 7, the test server 114 is enabled to monitor the power generator for an indicator that the power generator has been serviced/repaired, and/or determine when input from a user (e.g., an email, etc.) indicates that the power generator has been serviced/repaired (failure remediated) at step 718. In this scenario, the test server 114 generates an updated schedule at 711 and when the user is not present at 712, triggers a second round of test case executions at 713. In this example, the test case for the power generator will be initiated, but other test cases which passed the previous round of testing will not be executed by the test server 114 based on the recorded readiness of the other smart devices 122 of the user. In this way, testing may be performed iteratively as needed until all smart devices 122 at a location are determined to be in readiness by the test server 114.

With continued reference to the example of FIG. 7, at 719 the test server 114 determines the arrival of the blizzard that was anticipated at 704 and triggers the execution of emergency scenario activities associated with the category of critical event (blizzard) at the smart environment of the user. The test server 114 may implement the emergency scenario activities based on user profile information of the user (e.g., from the participant database 134), which may be both information entered by the user, as well as information gathered by the test server 114 over time in accordance with methods of embodiments of the invention.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    accessing, by a test server in communication with smart device controllers of respective remote participants, test case data that associates smart device commands with an event type based on historic event data from a plurality of remote participating smart devices;
    determining, by the test server, a test case for the event type based on the test case data, wherein the test case is configured to initiate a test of a plurality of smart device commands for respective different types of smart devices to determine successful or unsuccessful implementation of the smart device commands by the respective different types of smart devices;
    determining, by the test server, that the test case is a match for a plurality of the remote participants based on the test case matching stored participant data regarding smart devices of the plurality of the remote participants; and
    initiating, by the test server, execution of the test case by at least one remote smart device controller at a remote smart environment of each of the plurality of the remote participants based on the determining that the test case is a match for the plurality of the remote participants, wherein the execution causes the at least one smart device controller to test the smart device commands at the respective remote smart environments of each of the plurality of the remote participants.

2. The computer-implemented method of claim 1, further comprising:
    determining, by the test server, an estimated time period for remediating an unsuccessful implementation of the smart device command during the test;
    dynamically scheduling, by the test server, a time for the execution of the test case based on the estimated time period.

3. The computer-implemented method of claim 2, wherein the dynamically scheduling the time for the execution of the test case is further based on at least one of the group consisting of: a predicted time of an occurrence of an event of the event type; a predicted severity of the event; and a predicted duration of the event.

4. The computer-implemented method of claim 1, further comprising dynamically determining, by the test server, a frequency for executing the test case.

5. The computer-implemented method of claim 1, further comprising generating, by the test server, the test case based on the historic event data from the plurality of remote participating smart devices, wherein plurality of remote participating smart devices are smart devices located at a plurality of smart environments of the respective plurality of participants.

6. The computer-implemented method of claim 1, wherein a service provider at least one of creates, maintains, deploys and supports the computer device.

7. The computer-implemented method of claim 1, wherein the initiating the execution of the test case is provided by a service provider on a subscription, advertising, and/or fee basis.

8. The computer-implemented method of claim 1, wherein the test server includes software provided as a service in a cloud environment.

9. A computer program product, the computer program product comprising a computer readable storage medium having program instructions embodied therewith, the program instructions executable by a computing device to cause the computing device to:
    determining correlations between different types of critical events and a plurality of smart device functions based on historic smart device usage data from a plurality of remote smart environments to determine which of the plurality of smart device functions to test with respect to the respective different types of critical events;
    derive test cases for each of the different types of critical events based on the determined correlations, wherein each of the test cases comprises a set of instructions for initiating a test of a smart deice command within a smart environment;
    determine one of the test cases is a match for each of a plurality of participants;
    dynamically schedule execution of the one of the test cases at respective remote smart environments of each of the plurality of participants; and
    initiate the execution of the test case by respective smart device controllers of the plurality of participants, wherein the execution causes the respective smart device controllers to test the smart device command.

10. The computer program product of claim 9, wherein the program instructions further cause the computing device to determine that the test case can be initiated at the remote smart environment based on rules and participant data indicating a location of the participant with respect to the remote smart environment.

11. The computer program product of claim 9, wherein the program instructions further cause the computing device to determine an estimated time period for remediating an unsuccessful implementation of the smart device command during the test, and wherein the dynamically scheduling the execution is based on the estimated time period.

12. The computer program product of claim 9, wherein the test case is associated with a critical event which is determined to cause a significant deviation in usage of smart devices for a category of participant with in a network of participants.

13. The computer program product of claim 12, wherein the dynamically scheduling the execution is based on at least one of the group consisting of: a predicted time of an occurrence of the critical event associated with the test case; a predicted severity of the critical event; and a predicted duration of the critical event.

14. The computer program product of claim 12, wherein the program instructions further cause the computing device to capture interactions of one or more participants with smart devices within the network of participants during one or more historic events of the type of critical event.

15. A system comprising:
a processor, a computer readable memory, and a computer readable storage medium;
program instructions to predict an impending critical event associated with a location;
program instructions to determine that a predetermined test case associated with the impending critical event is a match for multiple remote smart environments of a plurality of participants based on registration information regarding smart devices of the participants, wherein the predetermined test case comprises program instructions to initiate functions in a plurality of smart devices to test whether the functions can be implemented successfully, and program instructions to return test data to the system;
program instructions to determine a schedule for execution of the test case at each of the respective remote smart environments of the participants; and
program instructions to initiate the execution of the test case by at least one remote smart device controller of a respective remote smart environment of the participants based on the schedule;
wherein the program instructions are stored on the computer readable storage medium for execution by the processor via the computer readable memory.

16. The system of claim 15 further comprising:
program instructions to determine an estimated time period for remediating an unsuccessful implementation of at least one of the functions during the test, wherein the scheduling the execution of the test case is based on the estimated time period.

17. The system of claim 15, wherein the scheduling the execution of the test case is based on at least one of the group consisting of: a predicted time of an occurrence of the critical event; a predicted severity of the critical event; and a predicted duration of the critical event.

18. The system of claim 15, further comprising:
program instructions to determine correlations between different types of critical events and a plurality of smart device functions based on historic smart device usage data from a plurality of remote smart environments to determine which of the plurality of smart device functions to test with respect to the respective different types of critical events; and
program instructions to derive test cases for each of the different types of critical events based on the determined correlations, wherein each of the test cases comprises a set of instructions for initiating a test of a smart deice command within a smart environment.

19. The system of claim 15, further comprising:
program instructions to determine if the test was executed successfully or unsuccessfully; and
program instructions to generate a notification based on a determination that the test was executed unsuccessfully.

20. The system of claim 19, further comprising program instructions to schedule a second execution of the test case for at least one of the multiple remote smart environments of the plurality of participants after the determination that the test was executed unsuccessfully; and
program instructions to initiate the second execution of the test case by the at least one remote smart device controller of the at least one of the multiple remote smart environments of the plurality of participants.

* * * * *